(12) United States Patent
Kann et al.

(10) Patent No.: US 12,272,237 B2
(45) Date of Patent: Apr. 8, 2025

(54) PEDESTRIAN AND VEHICLE CONGESTION RELIEF SYSTEM

(71) Applicant: Itron, Inc., Liberty Lake, WA (US)

(72) Inventors: James Lee Kann, Mica, WA (US); Mark K. Cornwall, Spokane, WA (US)

(73) Assignee: Itron, Inc., Liberty Lake, WA (US)

( * ) Notice: Subject to any disclaimer, the term of this patent is extended or adjusted under 35 U.S.C. 154(b) by 155 days.

(21) Appl. No.: 18/089,347

(22) Filed: Dec. 27, 2022

(65) Prior Publication Data

US 2024/0212492 A1   Jun. 27, 2024

(51) Int. Cl.
G08G 1/08 (2006.01)
G08G 1/005 (2006.01)

(52) U.S. Cl.
CPC .............. G08G 1/08 (2013.01); G08G 1/005 (2013.01)

(58) Field of Classification Search
CPC ................................. G08G 1/08; G08G 1/005
See application file for complete search history.

(56) References Cited

U.S. PATENT DOCUMENTS

| | | | |
|---|---|---|---|
| 8,751,163 B2 * | 6/2014 | Mitchell | G01C 21/3647 701/527 |
| 10,880,118 B2 * | 12/2020 | Stolfus | G08G 1/0133 |
| 11,403,954 B2 * | 8/2022 | Mortazavi | G08G 1/207 |
| 2006/0017588 A1 * | 1/2006 | Hilliard | G08G 1/01 340/995.13 |
| 2006/0064234 A1 * | 3/2006 | Kumagai | G08G 1/0104 701/117 |
| 2014/0011484 A1 * | 1/2014 | Yen | G08G 1/0133 455/414.1 |
| 2016/0069695 A1 * | 3/2016 | Broadbent | G01C 21/3667 701/411 |
| 2016/0210852 A1 * | 7/2016 | Buchholz | G08G 1/0129 |
| 2016/0223351 A1 * | 8/2016 | Sasse | G01C 21/3461 |

(Continued)

OTHER PUBLICATIONS

Baker,Francesca; The Technology that Could End Traffic Jams: BBC; Dec. 12, 2018; retrieved from https://www.bbc.com/future/article/20181212-can-artificial-intelligence-end-traffic-jams; 7 pages.

(Continued)

*Primary Examiner* — Hoi C Lau
(74) *Attorney, Agent, or Firm* — Lee & Hayes, P.C.

(57) ABSTRACT

Techniques for managing pedestrian and vehicular congestion are described herein. In an example, a congestion event at a location is identified. The congestion event may be a sporting event, entertainment event, road construction event, etc. A primary route to or from the congestion event is identified. In examples, a primary route conveys traffic to the location, and may be associated with commencement of the (Continued)

event. Alternatively or subsequently, a primary route conveys traffic away from the location, and may be associated with a conclusion of the event. A secondary route that could lessen traffic of the primary route is identified. In a first example, durations of vehicle traffic lights and pedestrian walk/don't walk signs are adjusted to encourage and to increase usage of the secondary route. In a second example, the secondary route is promoted by updating digital signage to send traffic on the secondary route.

21 Claims, 13 Drawing Sheets

(56) References Cited

U.S. PATENT DOCUMENTS

| | | | | |
|---|---|---|---|---|
| 2017/0359197 | A1* | 12/2017 | Stolfus | G08G 1/096816 |
| 2018/0283889 | A1* | 10/2018 | Koo | G01C 21/3484 |
| 2019/0049253 | A1* | 2/2019 | Kitamura | G08G 1/01 |
| 2020/0201353 | A1* | 6/2020 | Martin | G08G 1/096844 |
| 2021/0027619 | A1* | 1/2021 | Yusa | G08G 1/0133 |
| 2021/0043076 | A1* | 2/2021 | Yusa | G06Q 50/40 |
| 2021/0182993 | A1* | 6/2021 | Arian | G06Q 30/02 |
| 2022/0327921 | A1* | 10/2022 | Shen | G08G 1/0145 |
| 2022/0327925 | A1* | 10/2022 | Jackson | G06V 20/54 |
| 2024/0005782 | A1* | 1/2024 | Yu | G08G 1/0133 |
| 2024/0071213 | A1* | 2/2024 | Hirosawa | G08G 1/0141 |
| 2024/0212492 | A1* | 6/2024 | Kann | G08G 1/0112 |

OTHER PUBLICATIONS

DOT Congestion Mitigation Measures; retrieved on Dec. 3, 2022 from https://ops.fhwa.dot.gov/publications/fhwahop08022/appendix.htm; 8 pages.

Duke Today Heavy Traffic Expected; Duke University; Retrieved Dec. 3, 2022 from https://today.duke.edu/2022/08/heavy-traffic-expected-sept-2-home-football-game; 2 pages.

Gerell, Manne; "Does the Association Between Flows of People and Crime Differ Across Crime Types in Sweden?" European Journal on Criminal Policy and Research; pub Mar. 22, 2021; 17 pages.

Live Transport Information; retrieved from https://images.squarespace-cdn.com/content/v1/58ecf34929687f61a5ec08b0/1545141658084-GUYZ9XB921LSJBH68BSH/citycentre.jpg on Dec. 3, 2022; 1 page.

Movement Heat Maps; Crowd detection application to identify human movement trajectories in public spaces; retrieved from https://viso.ai/application/movement-heat-maps/ on Dec. 3, 2022; 2 pages.

Retallack, et al.; "Current Understanding of the Effects of Congestion on Traffic Accidents" Faculty of Sciences, School of Biological Sciences, The University of Adelaide, North Terrace Campus, Adelaide, Australia; pub Sep. 13, 2019; 13 pages.

Vancouver Digital Screen Ads; retrieved from https://digitalsignagehub.org/wp-content/uploads/2021/01/vancouver-digital-screen-ads-f-1.jpg on Dec. 3, 2022; 1 page.

PCT Search Report and Written Opinion mailed Feb. 12, 2024 for PCT Application No. PCT/US2023/034192 from PCT Summary, 26 pages.

* cited by examiner

PEDESTRIAN AND VEHICLE CONGESTION RELIEF SYSTEM

BACKGROUND

Congestion is a problem for pedestrian and vehicular traffic, and results in lost time and money. Congestion can be caused by events (e.g., sports, music, construction, etc.) that cause an influx of people to an area and/or make it harder to travel within the area. Congestion can be a problem for pedestrians and/or vehicles that are involved with such events. However, pedestrians and/or vehicles that are not involved with the event can also become entangled in the congestion as they try to pass through the area. Accordingly, technology to alleviate congestion would be appreciated by all, and would result in saved time and money.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

DETAILED DESCRIPTION

Techniques for managing and mitigating pedestrian and vehicular congestion are described herein. In an example, a congestion event (or potential congestion event) at a location is identified. The congestion event may be a sporting event, entertainment event, road construction event, etc. A primary route to or from the congestion event is identified. In examples, a primary route conveys traffic to the location, and may be associated with commencement of the event. Alternatively or subsequently, a primary route conveys traffic away from the location, and may be associated with a conclusion of the event. In either case, a secondary route that could lessen traffic of the primary route is identified. In a first example, durations of vehicle traffic lights and pedestrian walk/don't walk signs are adjusted to encourage and to increase usage of the secondary route. In a second example, the secondary route is promoted by updating digital signage to send traffic to the secondary route.

Example System and Techniques

Figure 1:
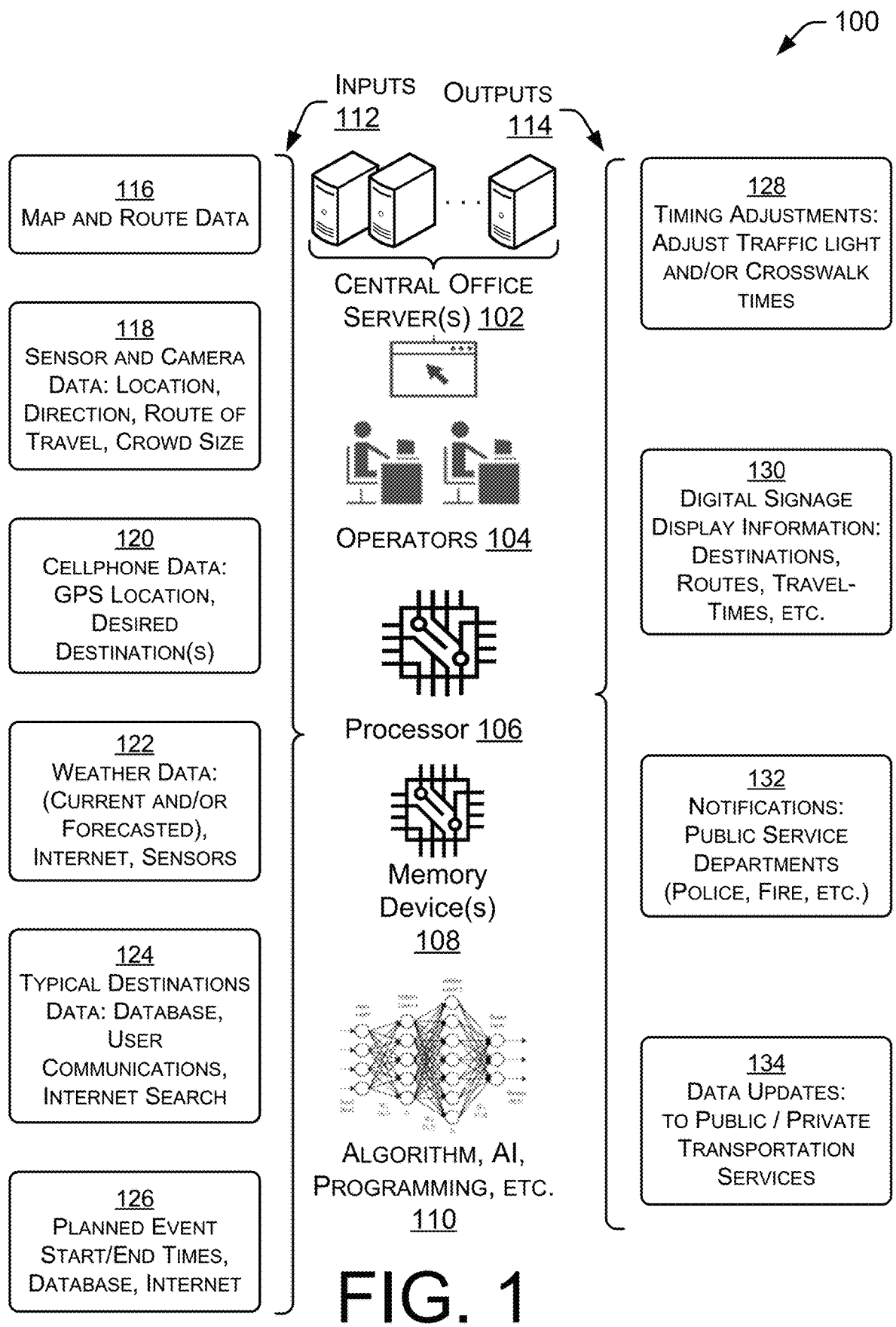
FIG. 1 is block diagram showing an example system configured for managing and alleviating pedestrian and vehicular congestion.

FIG. 1 shows an example system 100 configured for managing and alleviating pedestrian and vehicular (i.e., "traffic units") congestion. A congestion event may be caused by a sporting event, a musical concert, road construction, etc. It may degrade vehicular and/or pedestrian traffic flow, and increase transit times. In the example system 100, central office server(s) 102 may be configured to utilize input data (sensors, databases, internet, etc.) to create output data (secondary/alternative routes, communications with traffic units, etc.) to thereby alleviate the congestion. A staff of operators 104 may operate the central office server(s) 102. Each server may include a processor 106 and one or more memory device(s) 108, including long- and short-term storage. In the example shown, programming 110 including one or more algorithms, artificial intelligence, etc., may be defined in the memory device(s) 108. The programming 110 may receive inputs 112 and produce outputs 114.

While input data 112 is discussed below in a segmented fashion, aspects of the input data may be interrelated, and the presentation of the data is for purposes of illustration only.

Map and route data 116 defines the environment, and includes venues, walkways, parking lots, streets, arterials, highways, freeways, etc. The map and route data 116 allows primary and secondary routes to be defined to and from congestion events. The map and route data 116 is the environment within which the traffic units may be defined.

Sensor and camera data 118 may include any type of sensor, such as weather sensors and radar devices. Radar devices can be used to locate moving objects (vehicles, pedestrians, etc.), count such objects, and determine a direction of travel. Sensor data can determine locations and numbers of traffic units, direction(s) of movement, route(s) of travel, and crowd size. Accordingly, sensor and camera data 118, taken from a plurality of locations, may be used to determine the degree to which a location or region is experiencing a congestion event.

Cellular telephone data 120 may be obtained from applications running on cellphones and/or data obtained from cellphone carriers and/or cellular towers. Cellphone data 120 may include GPS or other location data, and may include the preferred or intended destination of the user. Such destinations may be specifically described (a specific hotel) or generally described (a type of restaurant).

Weather data 122 (both current and forecasted) may be obtained from sensors, the internet, government weather programs, etc.

The typical destinations data 124 may be obtained from database(s), user communications, internet searching, etc. The typical destinations 124 may include as one destination the cause of a congestion event, and may include locations to which event-goers proceed after the congestion event concludes. The typical destinations 124 may include the location of businesses and venues, hours of operation, and size or capacity. The typical destinations data 124 may include "secondary" destinations that may be patronized when the primary congestion event ends. In an example, a primary congestion event may end (e.g., a baseball game ends), and secondary congestion events may begin (e.g., pedestrian crowds may cross streets to bars and restaurants). All such destinations may be in the typical destinations data 124.

Planned event start/end times 126 may be obtained from database(s), the internet, publications, advertising, and any other practical source(s). The event start/end times can be used to determine times of greater and lesser congestion, as well as locations, areas, and routes of such congestion.

Outputs 114 may be used to predict, mitigate and/or obviate consequences of a congestion event.

Timing adjustments 128 may be used to adjust traffic light (and pedestrian walk/don't walk) timing to compensate for congestion. In an example, the traffic lights along a primary route to and/or from a congestion event (e.g., a professional football or baseball game) may be adjusted to allow the unusual traffic flow to have an unusually long period with a green light. Thus, timing adjustments 128 may provide traffic flow directions within an intersection the right-of-way in a manner that is more consistent with the traffic going in each direction.

Digital signage 130 may provide route information to pedestrians and vehicular traffic. The route information may include suggested routes and information on congestion (e.g., route times, wait times, etc.). In an example, the digital signage 130 may cycle information on a screen that indicates a destination and associated route(s) and travel times. Such directions may benefit out-of-towners who do not realize the destinations and/or routes are available, and may benefit the local population by suggesting a route that has a shorter travel time.

Notifications 132 may be provided to public services, such as police departments, fire departments, medical personnel (e.g., ambulance workers), and others. Such notifications may be used, for example, to plan an ambulance route.

Data updates 134 may also be provided to public transportation (e.g., municipal bus department) and private transportation (e.g., taxi companies). In an example, bus and taxi services may adjust a number of vehicles based on the congestion event. The adjustment may involve sending vehicles to ferry people into or out of the event area, or may involve sending vehicles on a route that avoids the congestion event area.

Figure 2:
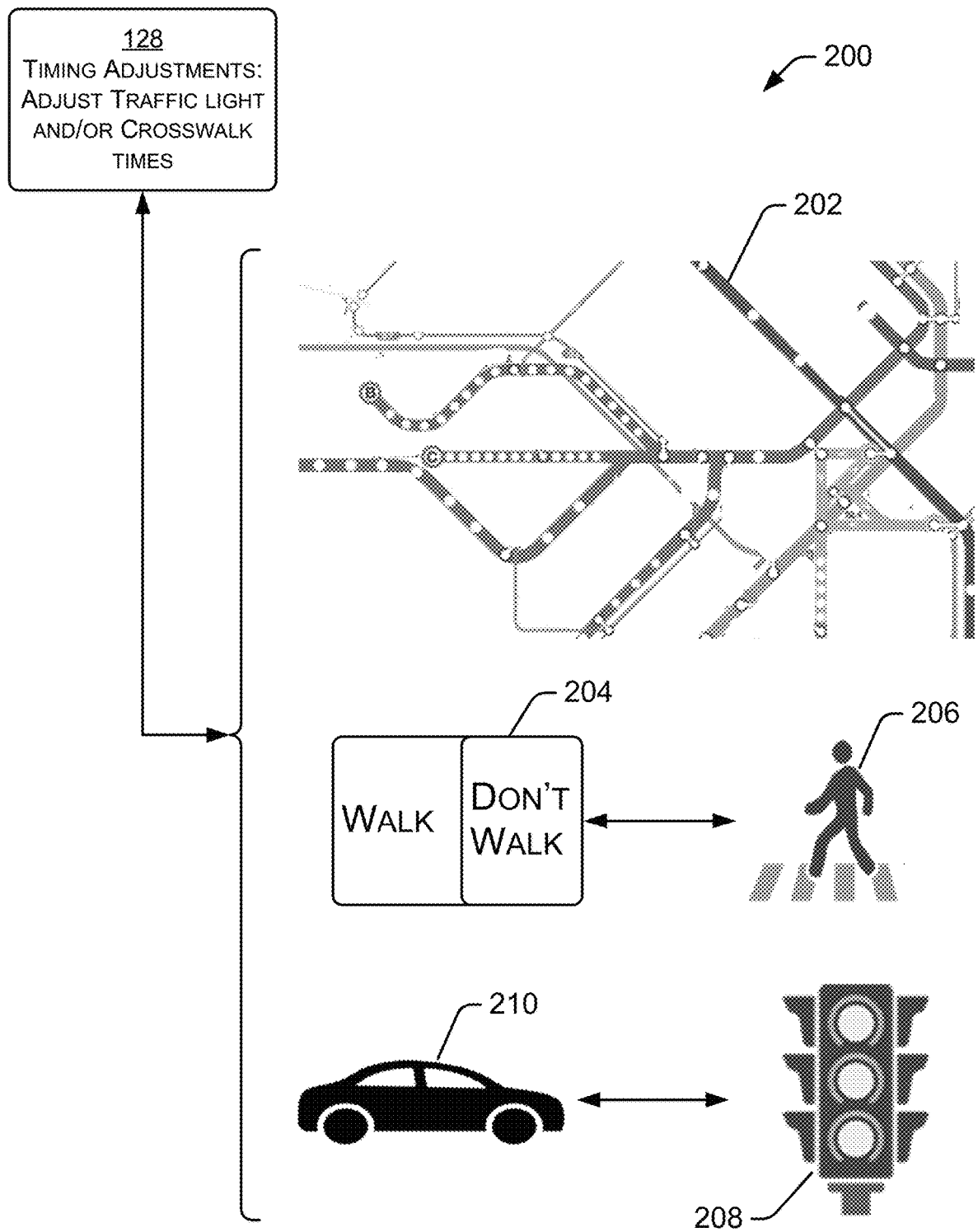
FIG. 2 is a block diagram showing example system operation, including traffic signal timing adjustment.

FIG. 2 shows an example portion 200 of the system 100, associated with traffic signal timing adjustment. Traffic light (and pedestrian walk/don't walk) timing adjustments 128 may be performed to compensate for congestion. In an example, a congestion area (e.g., the congested area 202 of a region) may include a number of routes (e.g., a sequence of arterial streets). By adjusting the traffic lights and pedestrian walk/don't walk signs, the flow of traffic may be managed.

As seen in FIG. 2, the walk/don't walk signs 204 governing pedestrian traffic 206 and the traffic lights 208 governing vehicular traffic 210 are both adjusted to promote smoother traffic flow. In an example, green lights for vehicles on less used arterials may be shortened to eliminate periods of time wherein few if any cars pass through an intersection. The provides additional time for congested traffic to move through the intersection.

In a further example of timing adjustments, in some instances the number of pedestrians waiting for a "walk" sign may be unusually high (e.g., when an event ends). The quantity of pedestrians may be determined by radar sensors and used to adjust the timing of traffic signals to result in a "walk sign" for the waiting pedestrians and a green light for vehicles going in the direction of the pedestrians across the intersection. The reverse may also be true, wherein an unusually large quantity of vehicles waiting to cross an intersection in a particular direction may be used to adjust the timing of traffic signals to result in a green light for the vehicles and a "walk" sign for pedestrians also moving across the intersection in the same direction.

Figure 3:
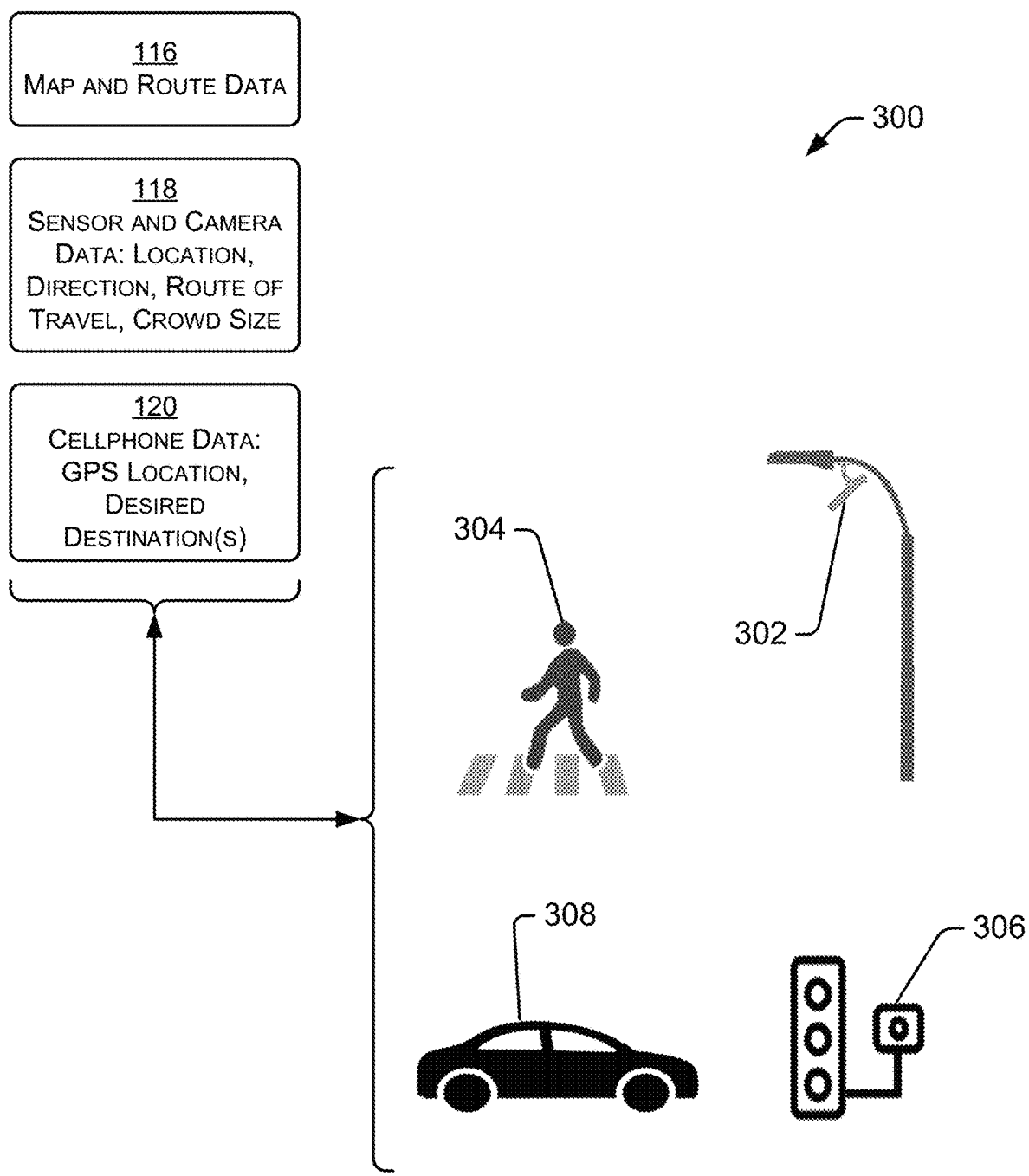
FIG. 3 is a block diagram showing example system operation, including sensor utilization within the system.

FIG. 3 shows an example portion 300 of the system 100 that is associated with operation of sensors within the system. Sensor and camera data 118 obtains information related to location of traffic units, direction of traffic unit movement, routes of traffic unit travel, and crowd size. Cellphone data 120 may include a GPS location of traffic units and in some cases their desired destination.

A number of different sensors can be used, such as cameras, radar, inductive switches (to detect vehicles at a light), etc. FIG. 3 shows a sensor 302 (e.g., a radar unit) mounted on a streetlight and configured to determine a number of pedestrians 304, their location, route of travel, direction of travel, time, etc. A sensor 306 mounted on a traffic light is configured to sense vehicles 308, and measures their location, route of travel, direction of travel, time, etc. Accordingly, sensors may be used to obtain a variety of inputs for the system 100.

FIG. 3 shows how a model of traffic patterns and congestion may be used to identify a congestion event. Using the map and route data 116, and the sensor and camera data 118, a distribution of locations and directions of movement of event-goers within the region of the congestion event could be modeled. In an example, responsive to a standard deviation of the distribution indicating congestion over a threshold value, the region could be identified as a congestion event.

Figure 4:
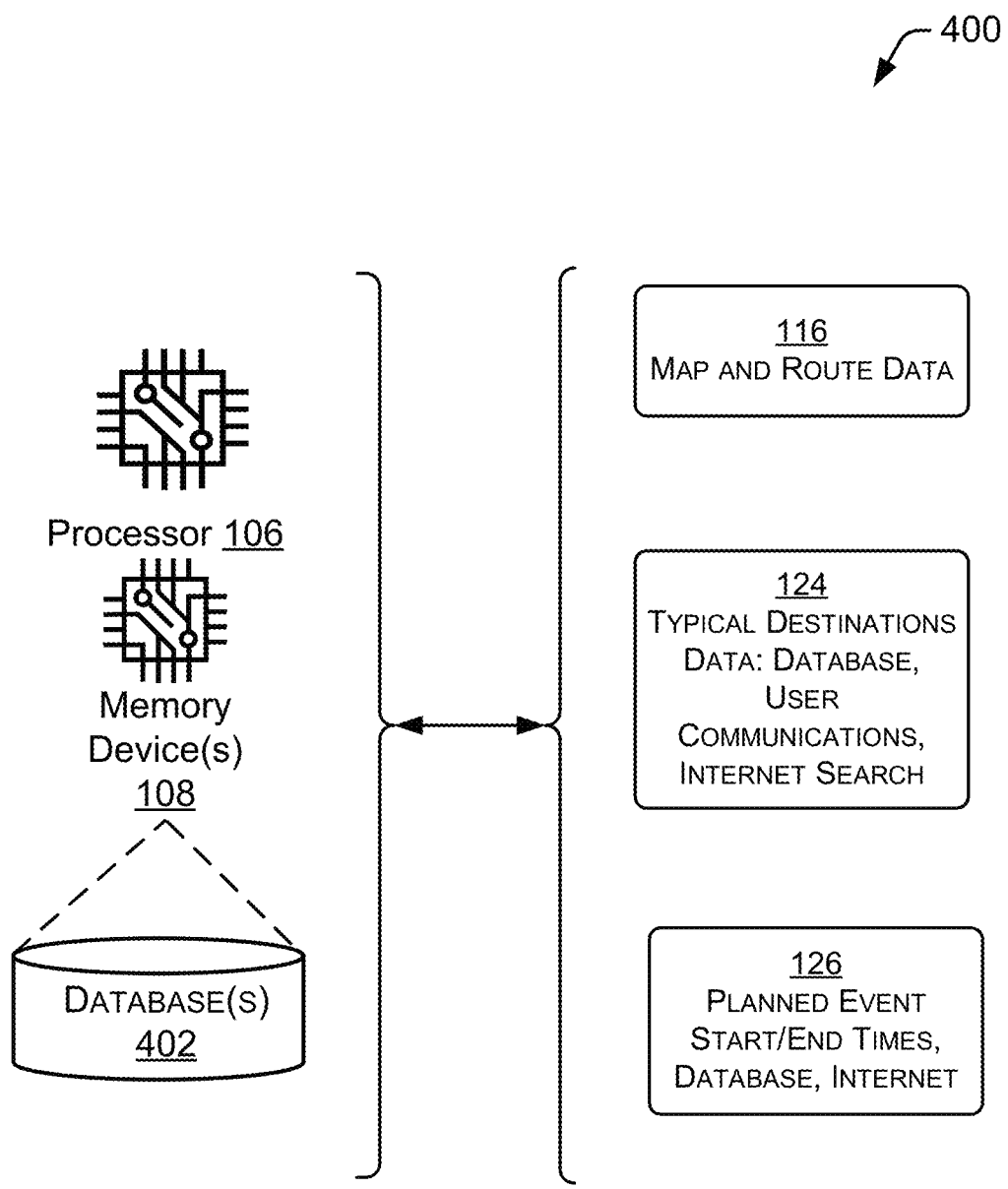
FIG. 4 is a block diagram showing example system operation, including utilization of database(s) having information regarding: routing, event scheduling sensor data, traffic unit locations, directions of travel, numbers, etc.

FIG. 4 shows an example portion 400 of the system 100, associated with operation of database(s) 402. The database(s) may include map and route data 116, typical destinations data 124, and planned event start/end times 126.

In the example of FIG. 4, a processor 106 is in communication with memory device(s) 108. The memory device(s) may contain one or more database(s) 402. The database(s) 402 assist with maps, business information, addresses, weather, event data, etc. The event data may include addresses, dates, start and end times, venue information, capacity information, etc., about events that may cause congestion.

Figure 5:
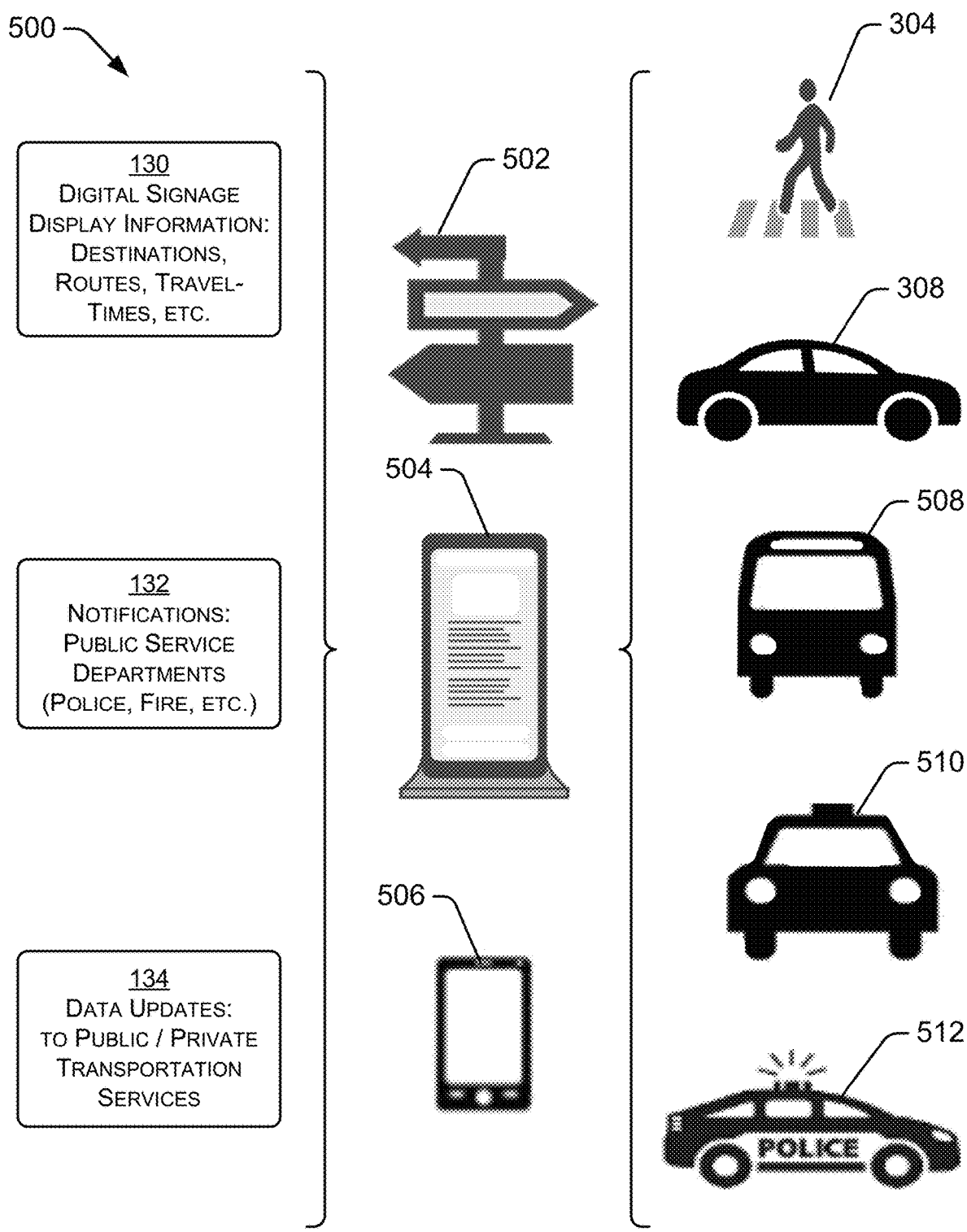
FIG. 5 is a block diagram showing example system operation, including utilization of communication devices, such as to promote alternative route usage.

FIG. 5 shows an example portion 500 of the system 100, associated with operation of communication devices, such as digital signage. In an example, digital signage provides information to pedestrian and vehicular traffic, including information about possible destinations, routes, expected travel-time, etc. In a second example, the system may communicate in a one-to-one manner with users, such as by cellphone. Data sent to—and/or received from—cellphones may show traffic unit locations, directions, routes, and destinations.

Referring to FIG. 5, the system may provide digital signage display information 130 to digital signage 502, 504. The signage may be directed at any person, but in particular at pedestrians 304 and vehicles 308 within, approaching, and/or leaving the congestion event/area. The sign 502 provides less information, but is quickly read and the information utilized. The sign 504 provides more information, and is better suited to pedestrians and/or drivers who are at a red light. The information may include destinations of possible interest, routes for consideration, travel times, route length, etc.

The digital signage display information 130 may also be presented to pedestrians and/or passengers of a vehicle by cellular telephone 506. A website URL and/or a quick response (QR) code may direct users to information that can be accessed by cellular telephone. The data available may include any data available and presented to the signage 502, 504. Additionally, a user may ask questions and receive route information. An algorithm or programming 110 may be configured to respond for individual requests for destination suggestions, routing suggestions, travel times, etc. The algorithm 110 may utilize GPS functionality of the cellphone to provide tailored and/or individualized information and reduce input required by the user.

The signage 502, 504 may provide information on how to utilize public transportation 508 and/or private transportation 510. Examples may include the location of bus stop and/or taxi pick-up locations. The information may be updated in real-time. The information may also include routes to the pick-up locations, and travel times to such locations.

In some examples, the signage 502, 504 may provide information about public safety departments, such as police or fire departments. An example message may warn the public of an emergency situation, and the need to make way for emergency vehicles 512. Accordingly, the signage may be configured to accept information from public safety departments. Such information may be sent directly to the signage by the departments, or to the system generally, such as at the central office server(s) 102.

Figure 6:
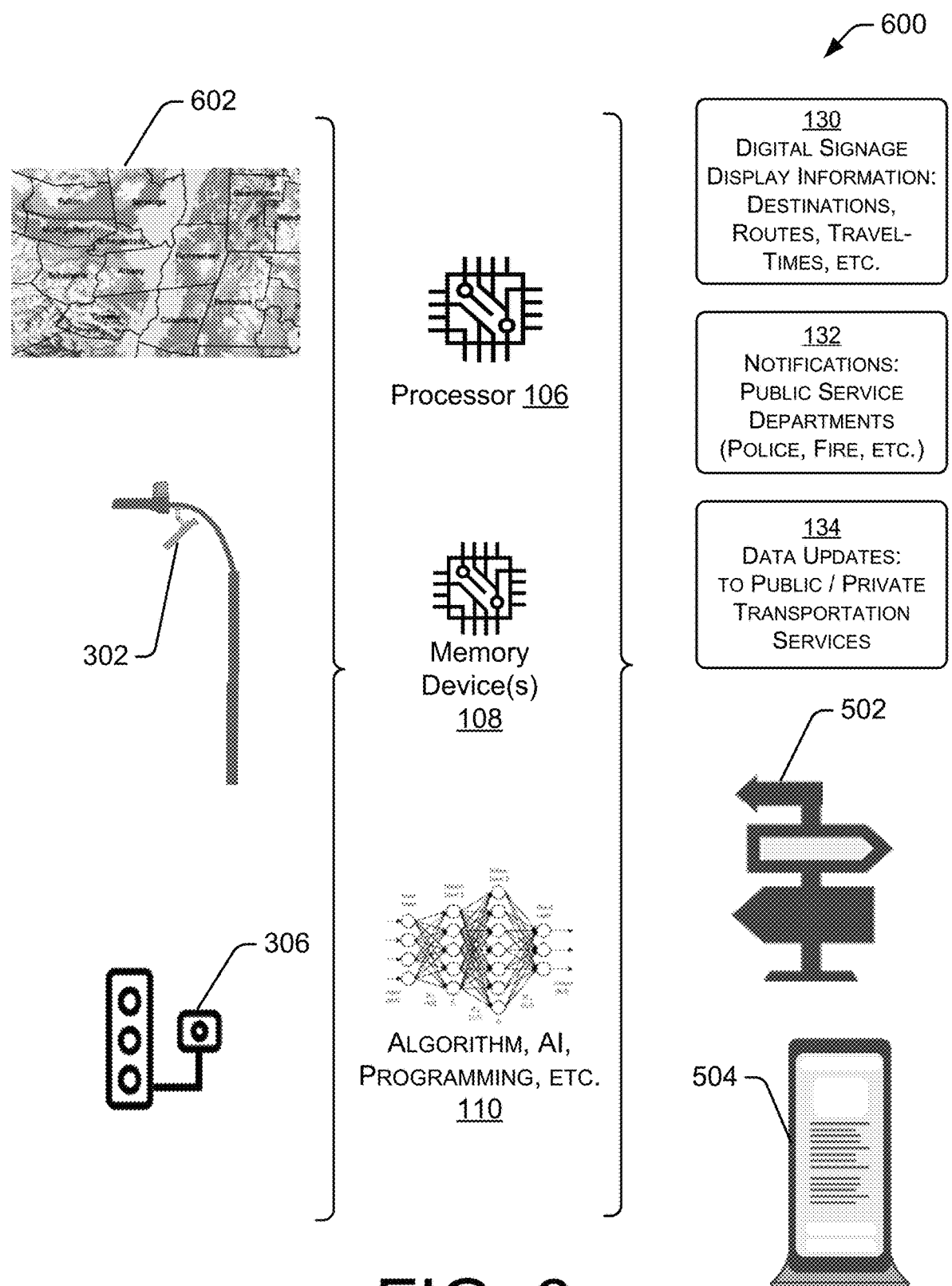
FIG. 6 is a block diagram showing example system operation, including techniques to anticipate and/or react to weather that affects routes used by pedestrian and vehicular traffic units.

FIG. 6 shows an example portion 600 of the system 100, associated with operation of the system to anticipate and/or react to weather that affects routes used by pedestrian and vehicular traffic units. Weather information may be obtained from one or more sources, such as weather maps 602, internet weather services, and/or sensors 302, 306. The weather information may be processed by an algorithm and/or programming 110, which may be defined in memory device 108 and accessed by processor 106. The weather information may be used to determine effects on congestion events and routes suggested to pedestrians and/or vehicles.

In a first example, weather information may affect the digital signage display information 130 displayed on signage 502, 504. Pedestrian routes may be calculated to afford maximum possible protection if it is raining. Traffic lights (walk/don't walk) may be made more sensitive to large groups of pedestrians if it is raining. Events (e.g., outdoor concerts or baseball games) may experience early departures, and routes and congestion may be determined and mitigated, respectively, based at least in part by expectations based on the weather. In such circumstances, the timing of a surge of vehicles leaving a parking lot may be based somewhat on the weather. Similarly, the surge of vehicles may be based somewhat on the score of a sporting event, with hometown team fans leaving early if their team is losing. Thus, the weather and many other factors may be utilized by programming 110 to determine appropriate pedestrian and vehicular routes, the information and timing of output to signage, and communications with users.

Notifications 132 to public service departments and data updates 134 to public and private transportation may also be based on the weather. People may be more likely to call a taxi or ride a bus if it is raining. Snow and ice may make it more likely that public service departments will respond to vehicular accidents. Accordingly, weather information is processed by the system 100 and is used to refine the outputs (e.g., signage) to result in better routes, more timely transit through the congestion event area, and safer conditions.

Figure 7:
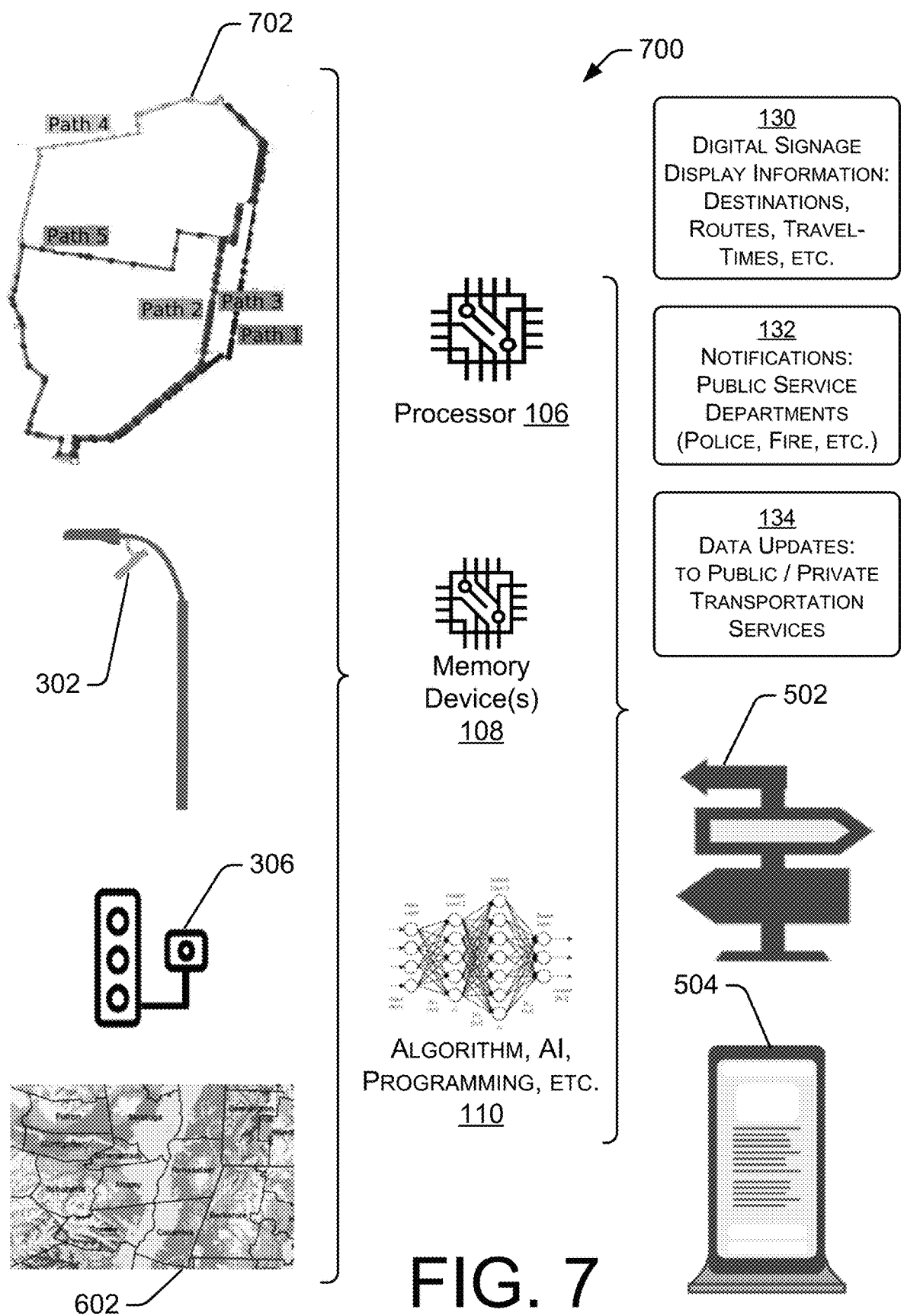
FIG. 7 is a block diagram showing example system operation, including creation of multiple alternative routes for promotion to alleviate congestion and lessen users' travel times.

FIG. 7 shows an example portion 700 of the system 100, associated with operation of the system to create multiple alternative routes for promotion to appropriate users to alleviate congestion and lessen users' travel times. The alternative routes may bypass a congestion event (i.e., a "bottleneck") and allow traffic unassociated with an event causing the congestion event to bypass the congestion. In the example of FIG. 7, inputs may include map, sensor, and/or weather information. The inputs may be processed by programming 110 defined on memory 108 and executed by a processor 106. The outputs may include one or more routes associated with one or more destinations.

In an example, map and available route information 702, sensor information 302, 306, and/or weather information 602 may be used as input to determine one or more routes for use in travel to one or more destinations. In some examples, several routes may be associated with one destination, and include one or more alternative routes. Use of the alternative routes lessens traffic on primary routes.

The outputs may include digital signage display information 130 (e.g., applied to signs 502, 504), notifications 132 to public service departments, and/or data updates 134 to public and private transportation providers.

Example Methods

In some examples of the techniques discussed herein, the methods of operation may be performed by one or more application specific integrated circuits (ASIC) or may be performed by a general-purpose processor utilizing software defined in computer readable media. In the examples and techniques discussed herein, the memory device(s) 108 may comprise computer-readable media and may take the form of volatile memory, such as random-access memory (RAM) and/or non-volatile memory, such as read only memory (ROM) or flash RAM. Computer-readable media devices include volatile and non-volatile, removable, and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device.

As defined herein, computer-readable media includes non-transitory media, and does not include transitory media, such as modulated data signals and carrier waves, and/or other information-containing signals.

The memory device(s) 108 may contain executable instructions, which when executed by the processor 106 perform operations in FIGS. 8 through 19.

Figure 8:
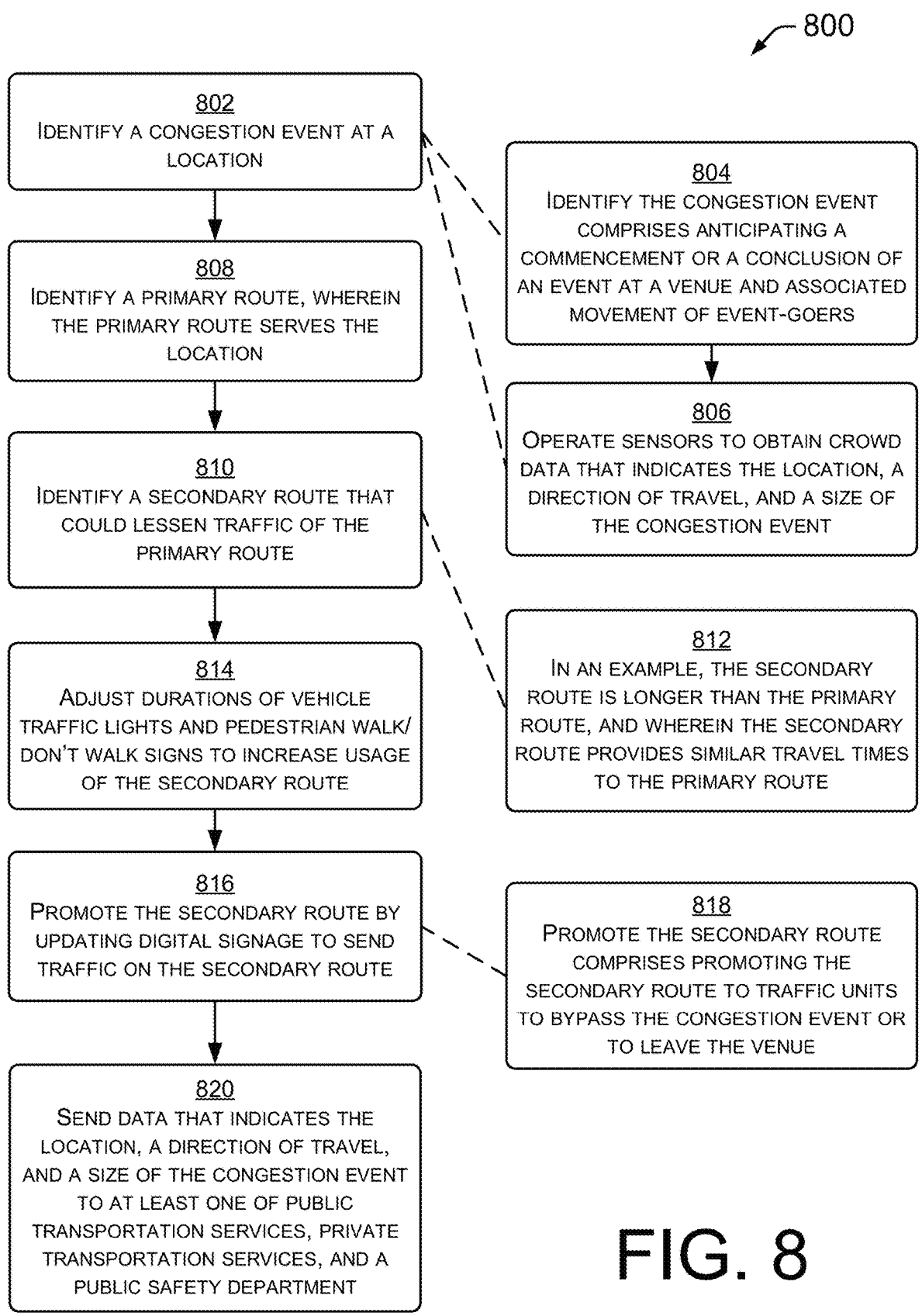
FIG. 8 is a flow diagram showing an example method for managing and alleviating pedestrian and vehicular congestion.

FIG. 8 shows an example method 800 for managing and reducing pedestrian and vehicular congestion. At block 802, a congestion event is identified at a location. The congestion event may be identified by sensor data, camera data, operators viewing the cameras, radar devices, etc. In the example of FIG. 1, sensor and camera data 118 can be used to identify a congestion event. In the example of block 804, identifying the congestion event comprises anticipating a commencement or a conclusion of an event at a venue or other location and associated movement of event-goers. In the example of block 806, sensors operate to obtain crowd data that indicates the location, a direction of travel, and a size of the congestion event. In the example of FIGS. 1 and 3, the sensor and camera data 118 and cellphone data 120 provide this information.

At block 808, a primary route that serves the location is identified. In the example of FIG. 1, sensor and camera data 118 with map and route data 116 can be used to identify the primary route.

At block 810, a secondary route that could lessen traffic of the primary route is identified. Similarly, sensor and camera data 118 with map and route data 116 can be used to identify the secondary route. In the example of block 812, the secondary route is longer than the primary route, but provides similar travel times to the primary route. While a shorter route may typically be preferred, the system 100 of FIG. 1 indicates that the longer route may take less time.

At block 814, durations of vehicle traffic lights and pedestrian walk/don't walk signs are adjusted to increase usage of the secondary route. In the example of FIG. 1, one of the outputs 114 of the system 100 are the timing adjustment 128, which adjust traffic light times or duration (e.g., how long the light stays green).

At block 816, the secondary route is promoted, such as by updating digital signage to send traffic on the secondary route. The example of FIG. 5 describes the promotion of routes. In the example of block 818, promoting the secondary route may include promoting the secondary route to traffic units to bypass the congestion event or to leave the venue.

At block 820, data is sent that indicates the location, a direction of travel, and a size of the congestion event to at least one of public transportation services, private transportation services, and a public safety department. The example of FIG. 5 describes the promotion of the congestion information to transportation and law enforcement departments.

Figure 9:
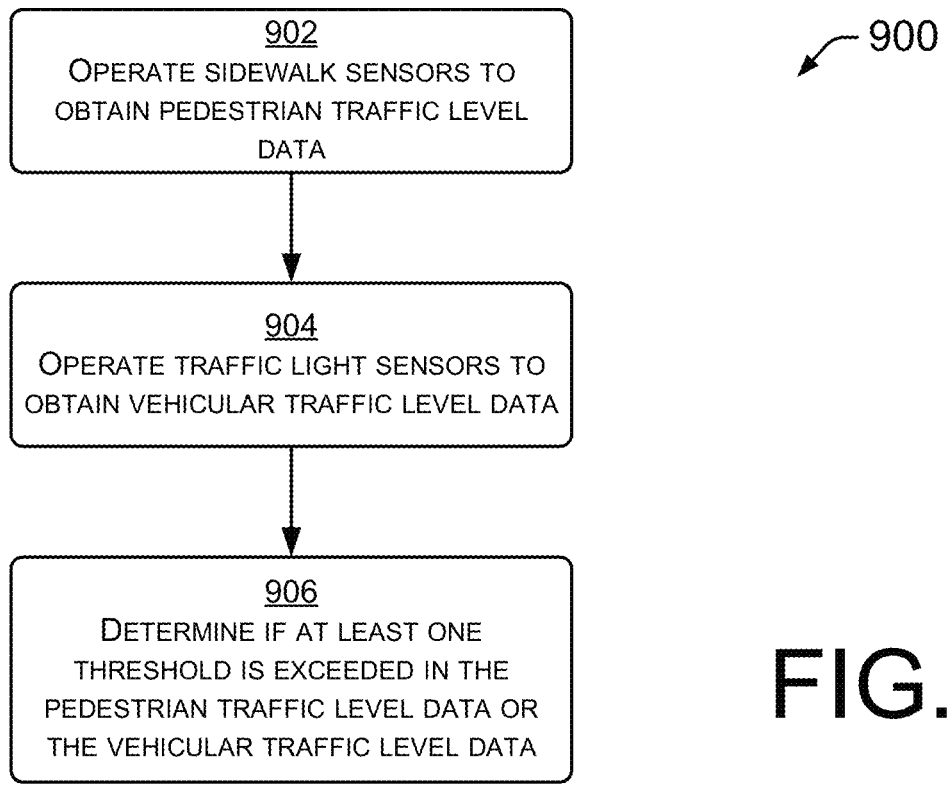
FIG. 9 is a flow diagram showing an example method of using sensors to identify a congestion event.

FIG. 9 shows an example method 900 of using sensors to identify a congestion event. FIG. 3 shows an example by which sensor and camera data, perhaps augmented by cellphone data, can be used to identify a congestion event, based on pedestrian traffic levels and/or vehicular traffic levels. At block 902, sidewalk sensors are operated to obtain pedestrian traffic level data. At block 904, traffic light sensors are operated to obtain vehicular traffic level data. At block 906, it is determined if at least one threshold was exceeded in the pedestrian traffic level data or the vehicular traffic level data.

Figure 10:
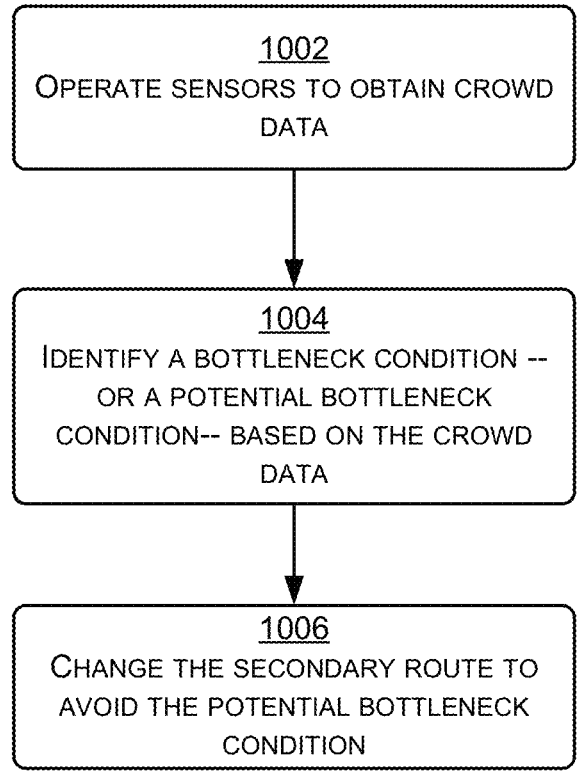
FIG. 10 is a flow diagram showing an example method for identifying a congestion "bottleneck condition," and changing a secondary route to avoid the condition.

FIG. 10 shows an example method 1000 for identifying a congestion "bottleneck condition," and changing a secondary route to avoid the congestion. FIG. 7 shows an example by which an alternative route may be used by traffic units seeking to avoid the congestion. At block 1002, sensors are operated to obtain crowd data. At block 1004, a bottleneck condition or a potential bottleneck condition is identified based on the crowd data. At block 1006, the secondary route is changed to avoid the potential bottleneck condition.

Figure 11:
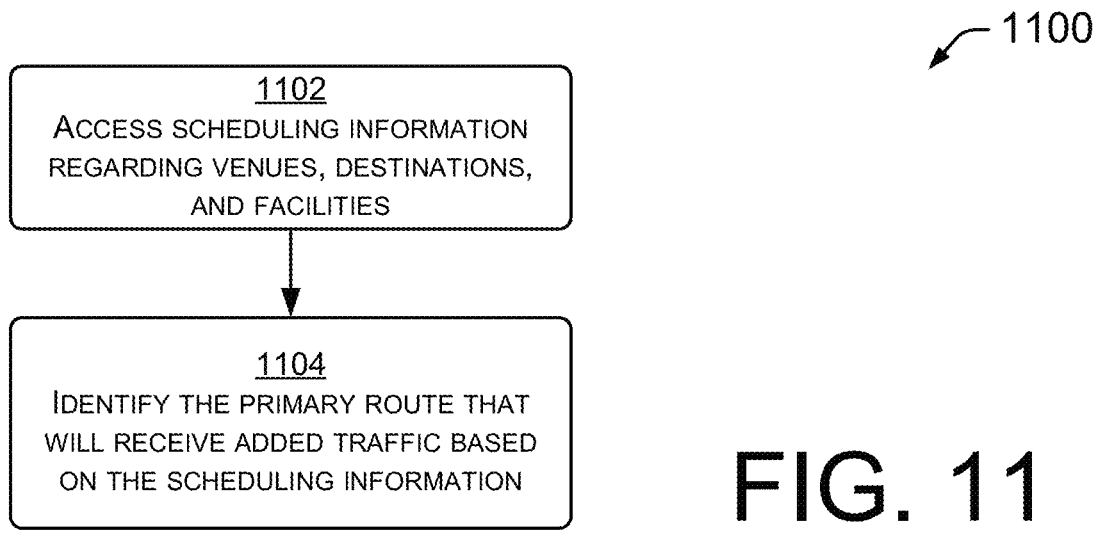
FIG. 11 is a flow diagram showing an example method to access scheduling information and identify an alternative route to receive added traffic.

FIG. 11 shows an example method 1100 to access scheduling information and identify a route to receive added traffic. FIG. 4 shows the use of a database 402, map and route data 116, and planned event start/end times 126, etc. Accordingly, by accessing the scheduling information described in FIG. 4, an event and relevant times could be obtained, as well as the routes that would be burdened by event-goers. At block 1102, scheduling information is accessed regarding venues, destinations, and facilities. At block 1104, the primary route is identified that will receive added traffic based on the scheduling information. Similarly, secondary routes that could be used to lessen traffic on the primary route could be identified.

Figure 12:
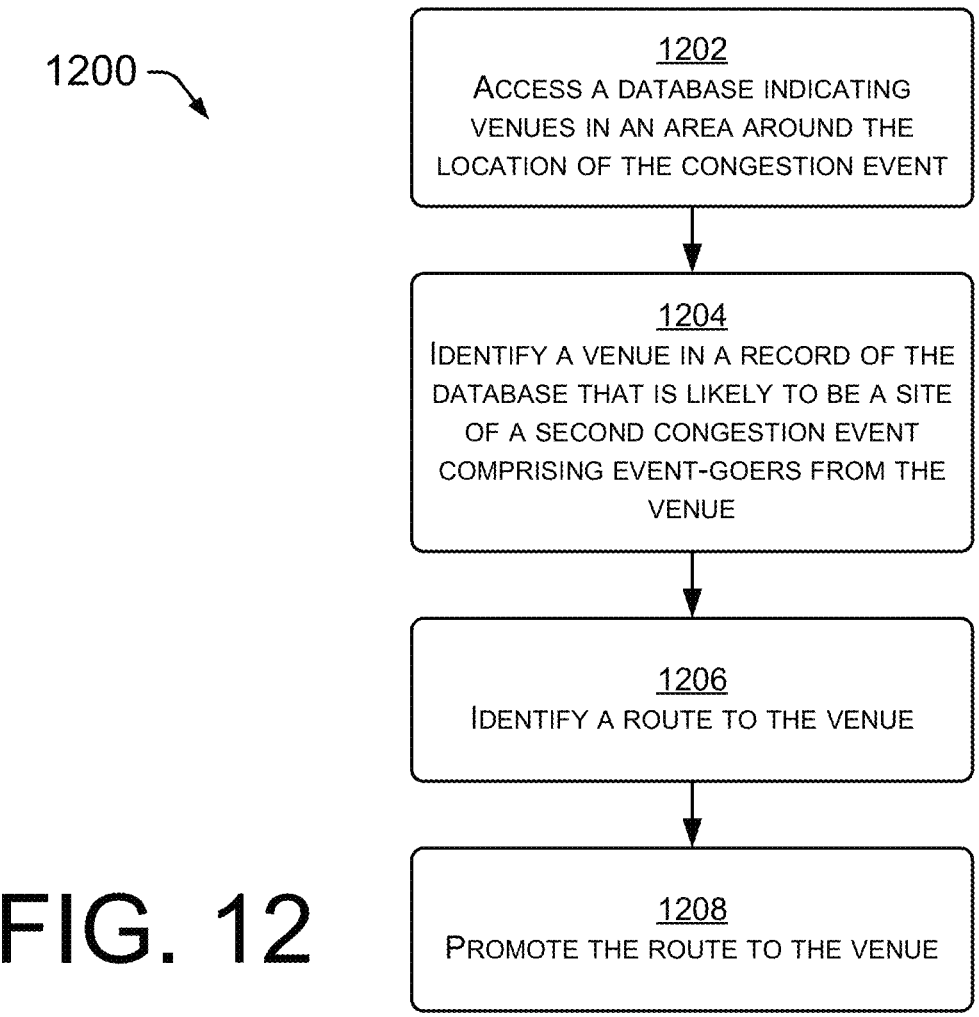
FIG. 12 is a flow diagram showing an example method to use a database or other data source(s) to identify venues in the vicinity of the congestion event and to identify routes for traffic units to proceed to a selected venue.

FIG. 12 shows an example method 1200 to use a database or other data source (e.g., the internet) to identify venues in the vicinity of the congestion event and to identify routes for traffic units to proceed to a selected venue. FIG. 4 describes a database and associated data. At block 1202, a data source is accessed—e.g. a database or the internet—indicating venues in an area around the location of the congestion event. At block 1204, a venue is identified, e.g., in a record of the database, that is likely to be a site of a second congestion event comprising event-goers from the venue. At block 1206, a route to the venue is identified. At block 1208, the route to the venue is promoted.

Figure 13:
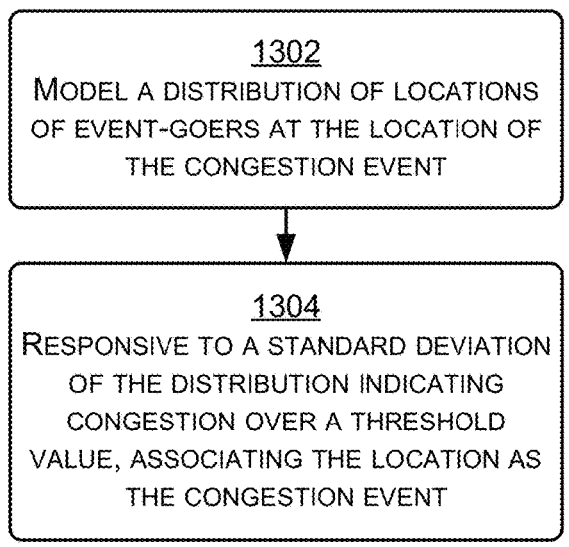
FIG. 13 is a flow diagram showing an example method to use a model of traffic patterns and congestion to identify a congestion event.

FIG. 13 shows an example method 1300 wherein a model of traffic patterns and congestion is used to identify a congestion event. Accordingly, method 1300 provides a method by which block 802 may be performed. FIG. 3 shows an example of modeling traffic congestion, and determination of a congestion event. At block 1302, a distribution of locations of event-goers at the location of the congestion event is modeled. At block 1304, responsive to a standard deviation of the distribution indicating congestion over a threshold value, the location is identified as the congestion event.

Figure 14:
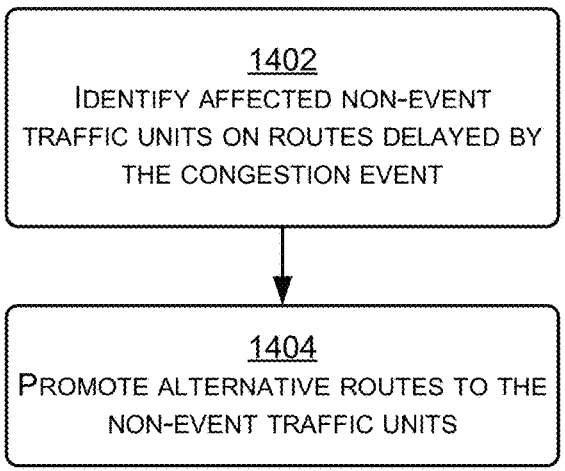
FIG. 14 is a flow diagram showing an example method by which traffic units that are not associated with the congestion event may be affected by the event, and by which such traffic units may be provided with alternative routes.

FIG. 14 shows an example method 1400 by which traffic units (e.g., vehicles or pedestrians) that are not associated with the congestion event may be affected by the event, and by which such traffic units may be provided with alternative routes. FIG. 7 describes the use of alternative routes to bypass a congestion event (and/or a "bottleneck") and allow traffic unassociated with an event causing the congestion event to bypass the congestion. At block 1402, affected non-event traffic units on routes delayed by the congestion event are identified. In an example, vehicles and pedestrians may become involved in the traffic associated with an event that they are not associated. At block 1404, alternative routes are promoted to the non-event traffic units. In an example, traffic units may not realize the congestion ahead of them. However, provision of alternative routes may save them time and expense.

Figure 15:
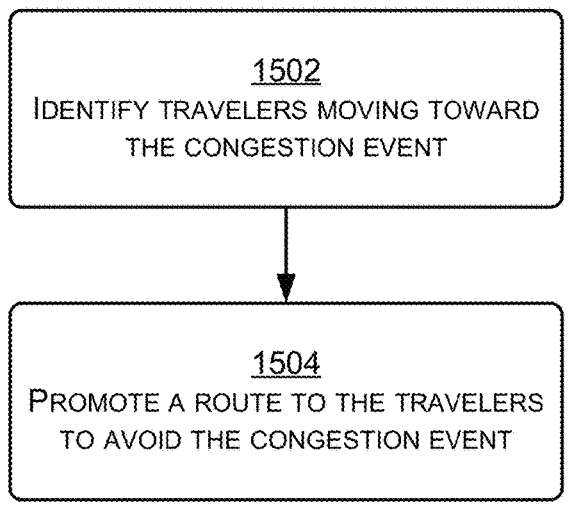
FIG. 15 is a flow diagram showing an example method by which travelers moving toward the congestion event may be identified and provided an appropriate route.

FIG. 15 shows an example method 1500 by which travelers moving toward the congestion event may be identified and provided an appropriate route. In an example, FIG. 7 describes the creation and promotion of alternative routes to allow traffic unassociated with an event causing the congestion event to bypass the congestion. At block 1502, travelers moving toward the congestion event may be identified. At block 1504, a route may be provided to the travelers. If they are going to the congestion event, a first preferred route may be provided. If they are trying to avoid the congestion event, a second preferred route may be provided.

Figure 16:
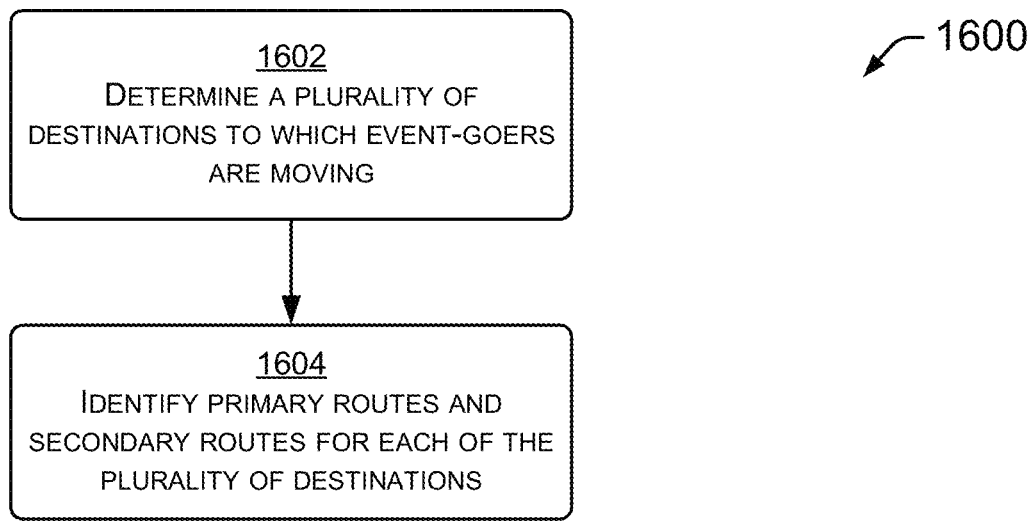
FIG. 16 is a flow diagram showing an example method by which event-goers headed to two or more different destinations may be provided appropriate routes.

FIG. 16 shows an example method 1600 by which event-goers headed to two or more different destinations may be provided appropriate routes. In an example, after a main event (e.g., a musical concert) concludes, event-goers may head for a plurality of different restaurants, taverns, etc. FIG. 5 describes how individualized route information may be provided to individual users. At block 1602, a plurality of destinations to which event-goers are moving is determined. Hotels, restaurants, taxi pick-up points, etc., are all examples. At block 1604, primary routes and secondary routes for each of the plurality of destinations are identified and provided to appropriate "traffic units," such as vehicle GPS devices, user's cellphones, digital signs, etc.

Figure 17:
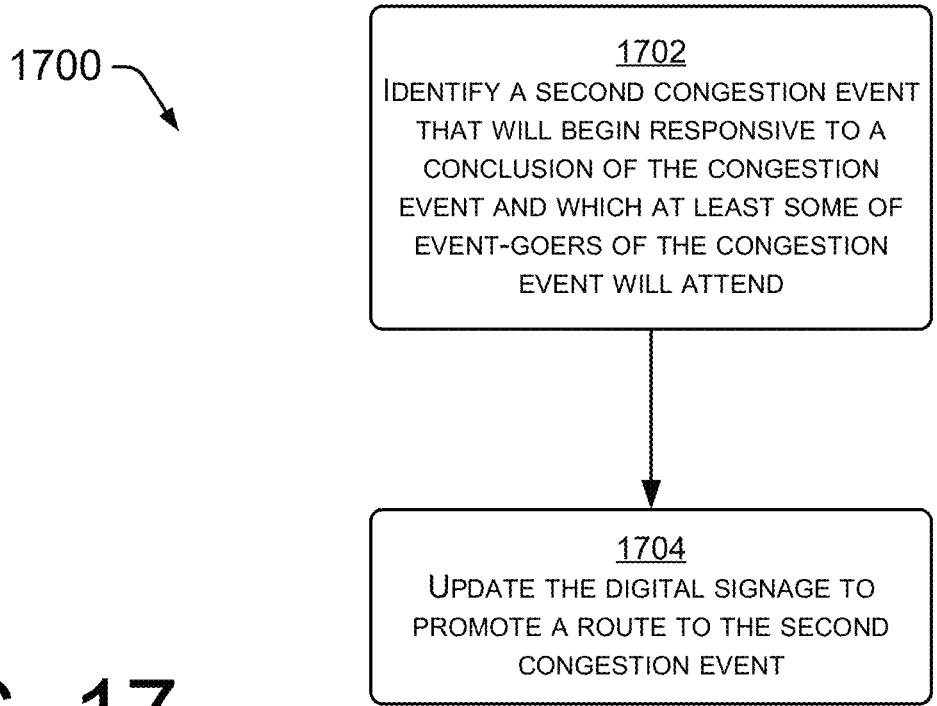
FIG. 17 is a flow diagram showing an example method to manage conclusion of one congestion event to avoid a second congestion event.

FIG. 17 shows an example method 1700 by which the conclusion of one congestion event (e.g., the end of a sporting event), can cause a second congestion event as people pursue further opportunities. At block 1702, a second congestion event is identified. The second congestion event may begin responsive to a conclusion of the congestion event and which at least some of event-goers of the congestion event will attend. In an example, a football or baseball game may cause a congestion event before it starts and after it ends. At block 1704, responsive to the identification of the second congestion event, digital signage is updated to promote a route to the second congestion event and/or around the second congestion event.

Figure 18:
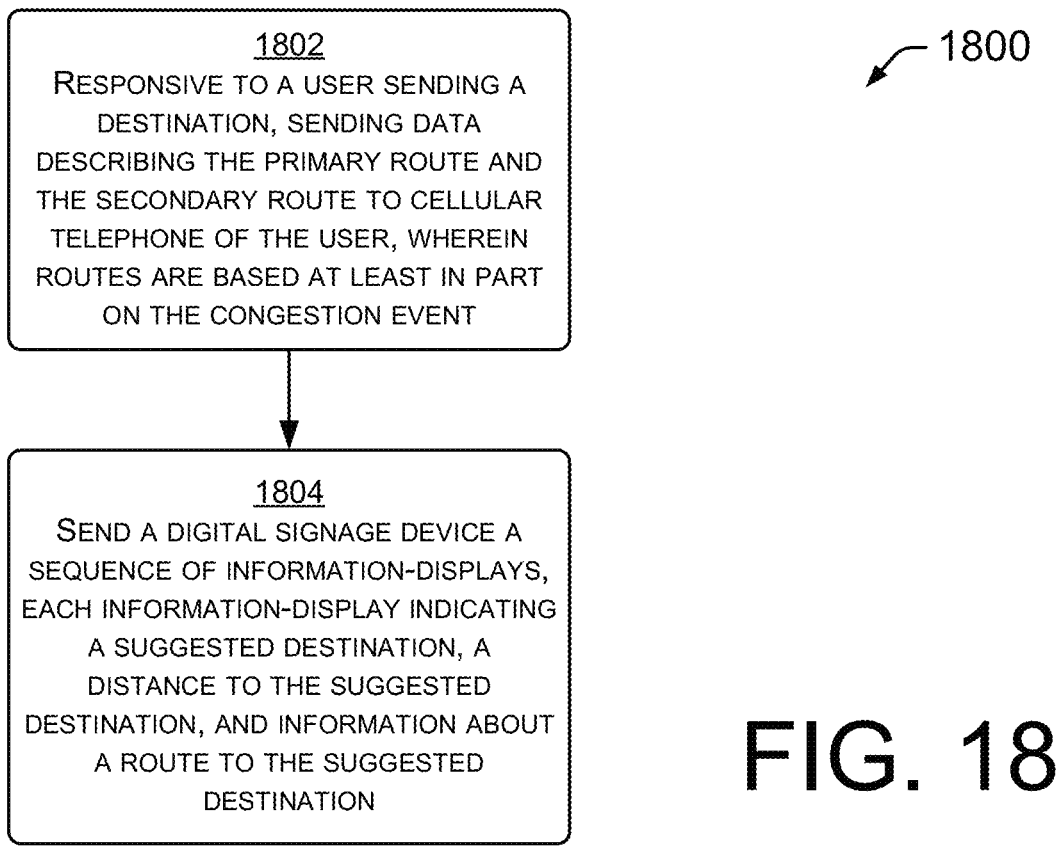
FIG. 18 is a flow diagram showing an example by which users can send a destination or a request for a suggested destination and receive information regarding a route in response.

FIG. 18 shows an example 1800 by which users, e.g., members of the public, can send a destination or a request for a suggested destination and receive information regarding a route in response. FIG. 5 describes how individualized route information may be provided to individual users. At block 1802, responsive to a user sending a destination, the system may send data describing the primary route and the secondary route to a cellular telephone of the user. In the example, the routes are based at least in part on the congestion event, and are tailored to help the user to avoid congestion (and to thereby avoid causing congestion) to the degree possible. At block 1804, the system may further send a digital signage device a sequence of information-displays, each information-display indicating: a suggested destination; a distance to the suggested destination; and/or information about a route to the suggested destination. The suggested destinations may be based at least in part on information (e.g., destinations of interest) sent by users.

Figure 19:
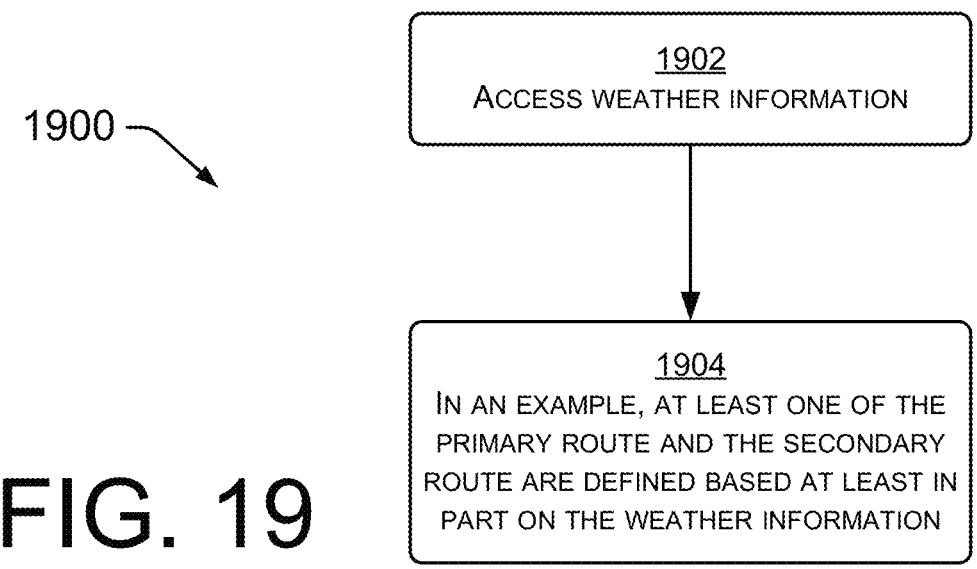
FIG. 19 is a flow diagram showing an example by which weather information may be used to determine primary routes, secondary routes, and/or destination(s).

FIG. 19 shows an example 1900 by which weather information may be used to determine primary routes and/or secondary routes. The weather information may also be used to suggest destinations. For example, outdoor sidewalk cafes may be suggested in some weather conditions, while indoor venues may be suggested in other weather conditions. FIG. 6 describe aspects of weather, and how weather affects primary and secondary routes. At block 1902, the system may access weather information, such as from the internet, a weather service, sensors, etc. In the example of block 1904, at least one of the primary route, the secondary route and/or the destination may be defined based at least in part on the weather information.

Example Systems and Devices

The following examples of a pedestrian and vehicle congestion relief system are expressed as numbered clauses. While the examples illustrate a number of possible configurations and techniques, they are not meant to be an exhaustive listing of the systems, methods, and/or techniques described herein.

1. A method to manage pedestrian and vehicle congestion, comprising: identifying a congestion event at a location; identifying a primary route, wherein the primary route serves the location; identifying a secondary route that could lessen traffic of the primary route; and adjusting durations of vehicle traffic lights and pedestrian walk/don't walk signs to increase usage of the secondary route.

2. The method of clause 1, additionally comprising: promoting the secondary route by updating digital signage to send traffic on the secondary route.

3. The method of clause 1, wherein: identifying the congestion event comprises anticipating a commencement or a conclusion of an event at a venue and associated movement of event-goers; and promoting the secondary route comprises promoting the secondary route to traffic units to bypass the congestion event or to leave the venue.

4. The method of clause 1, wherein identifying the congestion event comprises: operating sensors to obtain crowd data that indicates the location, a direction of travel, and a size of the congestion event.

5. The method of clause 1, wherein identifying the congestion event comprises: operating sidewalk sensors to obtain pedestrian traffic level data; operating traffic light sensors to obtain vehicular traffic level data; and determining if at least one threshold is exceeded in the pedestrian traffic level data or the vehicular traffic level data.

6. The method of clause 1, additionally comprising: operating sensors to obtain crowd data; identifying a potential bottleneck condition or a bottleneck condition based on the crowd data; and changing the secondary route to avoid the potential bottleneck condition.

7. The method of clause 1, additionally comprising: identifying travelers moving toward the congestion event; and promoting a route to the travelers to avoid the congestion event.

8. The method of clause 1, wherein identifying the congestion event comprises: modeling a distribution of locations of event-goers at the location of the congestion event; and responsive to a standard deviation of the distribution indicating congestion over a threshold value, associating the location as the congestion event.

9. A system to manage pedestrian and vehicle congestion, comprising: a processor; and a memory device in communication with the processor, wherein the memory device comprises instructions defined thereon, which when executed perform actions comprising: identifying a congestion event at a location; identifying a primary route, wherein the primary route serves the location; identifying a secondary route that could lessen traffic of the primary route; and updating digital signage to display information on destinations and routes based at least in part on pedestrian traffic data and vehicular traffic data.

10. The system of clause 9, wherein the actions additionally comprise: adjusting durations of vehicle traffic lights and pedestrian walk/don't walk signs to increase usage of the secondary route.

11. The system of clause 9, wherein the actions additionally comprise: determining a plurality of destinations to which event-goers are moving; and identifying primary routes and secondary routes for each of the plurality of destinations.

12. The system of clause 9, wherein the actions additionally comprise: identifying a second congestion event that will begin responsive to a conclusion of the congestion event and which at least some of event-goers of the congestion event will attend; and updating the digital signage to promote a route to the second congestion event.

13. The system of clause 9, wherein the secondary route is longer than the primary route, and wherein the secondary route provides similar travel times to the primary route.

14. The system of clause 9, wherein identifying the primary route comprises: accessing weather information; wherein at least one of the primary route and the secondary route are defined based at least in part on the weather information.

15. The system of clause 9, wherein the actions additionally comprise: accessing a database indicating venues in an area around the location of the congestion event; identifying a venue in a record of the database that is likely to be a site of a second congestion event comprising event-goers from the venue; identifying a route to the venue; and promoting the route to the venue.

16. One or more computer-readable media storing computer-executable instructions that, when executed by one or more processors, configure a computing device to perform acts comprising: identifying a congestion event at a location; identifying a primary route, wherein the primary route serves the location; identifying a secondary route that could lessen traffic of the primary route; and adjusting durations of vehicle traffic lights and pedestrian walk/don't walk signs to increase usage of the secondary route.

17. One or more computer-readable media as recited in clause 16, wherein the acts additionally comprise: sending data that indicates the location, a direction of travel, and a size of the congestion event to at least one of public transportation services, private transportation services, and a public safety department.

18. One or more computer-readable media as recited in clause 16, wherein the acts additionally comprise: responsive to a user sending a destination, sending data describing the primary route and the secondary route to a cellular telephone of the user, wherein routes are based at least in part on the congestion event.

19. One or more computer-readable media as recited in clause 16, wherein the acts additionally comprise: sending a digital signage device a sequence of information-displays, each information-display indicating a suggested destination, a distance to the suggested destination, and information about a route to the suggested destination.

20. One or more computer-readable media as recited in clause 16, wherein the acts additionally comprise: identifying affected non-event traffic units on routes delayed by the congestion event; and promoting alternative routes to the non-event traffic units.

21. One or more computer-readable media as recited in clause 16, wherein the acts additionally comprise: accessing scheduling information regarding venues, destinations, and facilities; and identifying the primary route that will receive added traffic based on the scheduling information.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

The words comprise, comprises, and/or comprising, when used in this specification and/or claims specify the presence of stated features, devices, techniques, and/or components. The words do not preclude the presence or addition of one or more other features, devices, techniques, and/or components and/or groups thereof.

The invention claimed is:

1. A method to manage pedestrian and vehicle congestion, comprising:
   identifying a congestion event at a location, wherein start and end times of the congestion event are obtained from one or more databases;
   identifying one or more secondary congestion event(s), wherein the one or more secondary events are expected to be patronized during times based at least in part on the start time or end time of the congestion event and the location;
   identifying a primary route, wherein the primary route serves the location;
   identifying, based at least in part on the congestion event and the one or more secondary congestion event(s), a secondary route usable to lessen traffic of the primary route; and
   adjusting durations of vehicle traffic lights and pedestrian walk/don't walk signs to increase usage of the secondary route.

2. The method of claim 1, additionally comprising:
   promoting the secondary route by updating digital signage to send traffic on the secondary route.

3. The method of claim 1, wherein:
   identifying the congestion event comprises anticipating a commencement or a conclusion of an event at a venue and associated movement of event-goers; and
   promoting the secondary route comprises promoting the secondary route to traffic units to bypass the congestion event or to leave the venue.

4. The method of claim 1, wherein identifying the congestion event comprises:
   operating radar sensors to obtain data comprising pedestrian traffic that indicates the location, a direction of travel, and a size of the congestion event.

5. The method of claim 1, wherein identifying the congestion event comprises:
   operating sidewalk sensors to obtain pedestrian traffic level data;
   operating traffic light sensors to obtain vehicular traffic level data; and
   determining if at least one threshold is exceeded in the pedestrian traffic level data or the vehicular traffic level data.

6. The method of claim 1, additionally comprising:
   operating sensors to obtain crowd data;
   identifying a potential bottleneck condition or a bottleneck condition based on the crowd data; and
   changing the secondary route to avoid the potential bottleneck condition.

7. The method of claim 1, additionally comprising:
identifying travelers moving toward the congestion event; and
promoting a route to the travelers to avoid the congestion event.

8. The method of claim 1, wherein identifying the congestion event comprises:
modeling a distribution of locations of event-goers at the location of the congestion event; and
responsive to a standard deviation of the distribution indicating congestion over a threshold value, associating the location as the congestion event.

9. A system to manage pedestrian and vehicle congestion, comprising:
a processor; and
a memory device in communication with the processor, wherein the memory device comprises instructions defined thereon, which when executed perform actions comprising:
identifying a congestion event at a location, wherein start and end times of the congestion event are obtained from one or more databases;
identifying one or more secondary congestion event(s), wherein the one or more secondary events are expected to be patronized during times based at least in part on the start time or end time of the congestion event and the location;
identifying a primary route, wherein the primary route serves the location;
identifying, based at least in part on the congestion event and the one or more secondary congestion event(s), a secondary route usable to lessen traffic of the primary route; and
updating digital signage to display information on destinations and routes based at least in part on pedestrian traffic data and vehicular traffic data.

10. The system of claim 9, wherein the actions additionally comprise:
adjusting durations of vehicle traffic lights and pedestrian walk/don't walk signs to increase usage of the secondary route.

11. The system of claim 9, wherein the actions additionally comprise:
determining a plurality of destinations to which event-goers are moving; and
identifying primary routes and secondary routes for each of the plurality of destinations.

12. The system of claim 9, wherein the actions additionally comprise:
identifying a second congestion event that will begin responsive to a conclusion of the congestion event and which at least some of event-goers of the congestion event will attend; and
updating the digital signage to promote a route to the second congestion event.

13. The system of claim 9, wherein the secondary route is longer than the primary route, and wherein the secondary route provides similar travel times to the primary route.

14. The system of claim 9, wherein identifying the primary route comprises:
accessing weather information;
wherein at least one of the primary route and the secondary route are defined based at least in part on the weather information.

15. The system of claim 9, wherein the actions additionally comprise:
accessing a database indicating venues in an area around the location of the congestion event;
identifying a venue in a record of the database that is likely to be a site of a second congestion event comprising event-goers from the venue;
identifying a route to the venue; and
promoting the route to the venue.

16. One or more computer-readable media storing computer-executable instructions that, when executed by one or more processors, configure a computing device to perform acts comprising:
identifying a congestion event at a location, wherein start and end times of the congestion event are obtained from one or more databases;
identifying one or more secondary congestion event(s), wherein the one or more secondary events are expected to be patronized during times based at least in part on the start time or end time of the congestion event and the location;
identifying a primary route, wherein the primary route serves the location;
identifying, based at least in part on the congestion event and the one or more secondary congestion event(s) a secondary route usable to lessen traffic of the primary route; and
adjusting durations of vehicle traffic lights and pedestrian walk/don't walk signs to increase usage of the secondary route.

17. One or more computer-readable media as recited in claim 16, wherein the acts additionally comprise:
sending data that indicates the location, a direction of travel, and a size of the congestion event to at least one of public transportation services, private transportation services, and a public safety department.

18. One or more computer-readable media as recited in claim 16, wherein the acts additionally comprise:
responsive to a user sending a destination, sending data describing the primary route and the secondary route to a cellular telephone of the user, wherein routes are based at least in part on the congestion event.

19. One or more computer-readable media as recited in claim 16, wherein the acts additionally comprise:
sending a digital signage device a sequence of information-displays, each information-display indicating a suggested destination, a distance to the suggested destination, and information about a route to the suggested destination.

20. One or more computer-readable media as recited in claim 16, wherein the acts additionally comprise:
identifying affected non-event traffic units on routes delayed by the congestion event; and
promoting alternative routes to the non-event traffic units.

21. One or more computer-readable media as recited in claim 16, wherein the acts additionally comprise:
accessing scheduling information regarding venues, destinations, and facilities; and
identifying the primary route that will receive added traffic based on the scheduling information.

* * * * *